(12) United States Patent
Kamel et al.

(10) Patent No.: US 12,142,960 B2
(45) Date of Patent: Nov. 12, 2024

(54) RECHARGEABLE ENERGY STORAGE SYSTEM BALANCING

(71) Applicant: GM Global Technology Operations LLC, Detroit, MI (US)

(72) Inventors: Mohamed Kamel, Rochester, MI (US); Muhammad Hussain Alvi, Troy, MI (US); Alireza Fatemi, Canton, MI (US); Chandra S. Namuduri, Troy, MI (US); Rashmi Prasad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 184 days.

(21) Appl. No.: 17/839,691

(22) Filed: Jun. 14, 2022

(65) Prior Publication Data
US 2023/0402870 A1     Dec. 14, 2023

(51) Int. Cl.
| | |
|---|---|
| H02J 7/00 | (2006.01) |
| H02J 7/14 | (2006.01) |
| H02M 1/00 | (2007.01) |
| H02P 25/022 | (2016.01) |

(52) U.S. Cl.
CPC .......... *H02J 7/1423* (2013.01); *H02J 7/0063* (2013.01); *H02M 1/0043* (2021.05); *H02P 25/022* (2013.01)

(58) Field of Classification Search
CPC .... H02J 7/1423; H02J 7/0063; H02J 2207/20; H02J 7/02; H02J 2310/48; H02J 7/0013; H02J 1/082; H02J 7/007; H02J 1/10; H02M 1/0043; H02M 3/156; H02M 3/1586; H02M 7/5387; H02P 25/022; Y02T 10/72; Y02T 90/12; Y02T 10/92; Y02T 10/64; Y02T 10/62; Y02T 90/14; Y02T 10/7072; Y02T 10/70; B60L 2210/14; B60L 2210/10; B60L 2210/30; B60L 2210/40; B60L 53/24; B60L 15/007; B60L 2240/547; B60L 53/11; B60L 50/60; B60L 2240/527; B60L 58/12; B60L 50/16; B60L 55/00; B60L 50/61; B60L 53/53
USPC ....... 307/9.1, 10.1, 10.7; 320/108, 109, 104, 320/128, 162, 136, 145, 119, 105; 363/65, 131; 903/904, 907, 903, 930
See application file for complete search history.

(56) References Cited

U.S. PATENT DOCUMENTS

| | | | |
|---|---|---|---|
| 11,383,607 B1 * | 7/2022 | Prasad ................... | B60L 53/24 |
| 2013/0106256 A1 * | 5/2013 | Mizukoshi .............. | H02P 27/08 |
| | | | 310/68 D |
| 2023/0327596 A1 * | 10/2023 | Nishimura ............. | B60L 58/14 |

* cited by examiner

*Primary Examiner* — Elim Ortiz
(74) *Attorney, Agent, or Firm* — CANTOR COLBURN LLP

(57) ABSTRACT

A method and apparatus for electrical energy transfer between a pair of series connected batteries coupled between positive and negative DC rails of a power inverter operatively connected to a plurality of stator phase windings of a stator winding of a motor may include coupling a midpoint of the pair of series connected batteries to the stator winding of the motor, and controlling the power inverter to operate the power inverter and the stator winding as a switched-mode power converter to charge at least one of the stator phase windings from one of the pair of series connected batteries and to discharge the at least one of the stator phase windings to the other of the pair of series connected batteries.

11 Claims, 5 Drawing Sheets

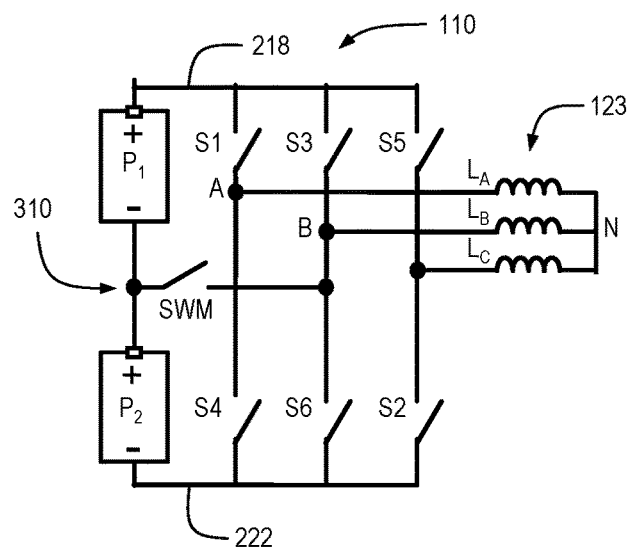 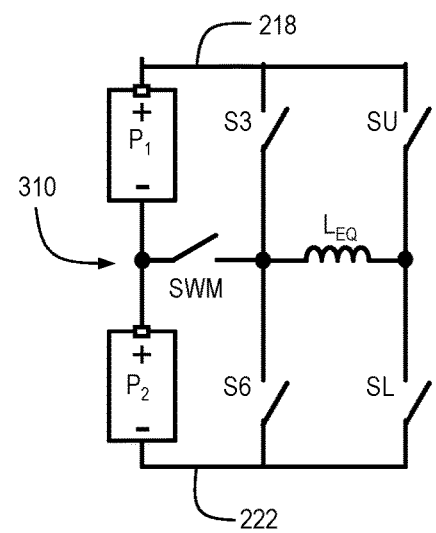
FIG. 6A    FIG. 6B
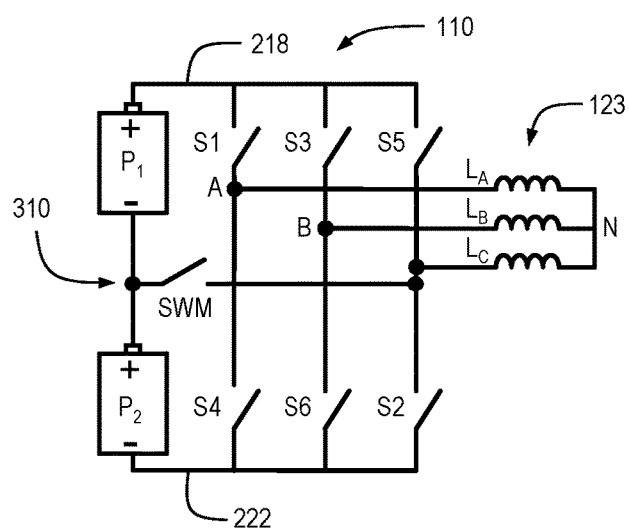 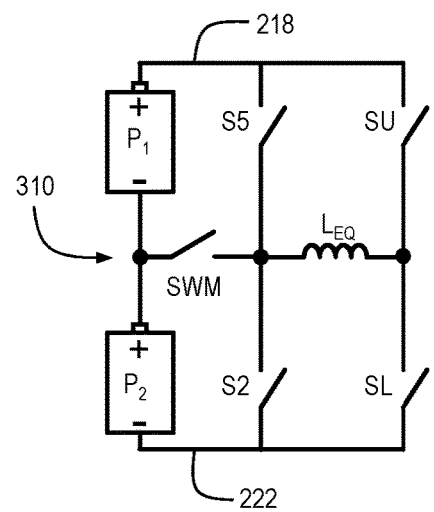
FIG. 7A    FIG. 7B

RECHARGEABLE ENERGY STORAGE SYSTEM BALANCING

INTRODUCTION

The subject disclosure relates to electric vehicle recharging. More particularly, the subject disclosure relates to recharging electric vehicles having a reconfigurable rechargeable energy storage system.

Individual capacity, state of charge, depth of discharge, state of health and voltage of battery packs, battery modules and cells within a rechargeable energy storage system may not be equivalent. Differences may occur even with matched battery packs, battery modules, and cells of equivalent age, chemistry and design capacity due to factors such as load imbalance, short or long term discharge history differentials, temperature gradients, high voltage bus wiring, and others. Such differences may manifest prior to, during or after recharge cycles introducing challenges in recharging and reconfiguring modular rechargeable energy storage systems.

SUMMARY

In one exemplary embodiment, a method for electrical energy transfer between a pair of series connected batteries coupled between positive and negative DC rails of a power inverter operatively connected to a plurality of stator phase windings of a stator winding of a motor may include coupling a midpoint of the pair of series connected batteries to the stator winding of the motor, and controlling the power inverter to operate the power inverter and the stator winding as a switched-mode power converter to charge at least one of the stator phase windings from one of the pair of series connected batteries and to discharge the at least one of the stator phase windings to the other of the pair of series connected batteries.

In addition to one or more of the features described herein, the method may be performed periodically during a DC fast charging cycle.

In addition to one or more of the features described herein, the method may be performed upon completion of a DC fast charging cycle.

In addition to one or more of the features described herein, coupling the midpoint of the pair of series connected batteries to the stator winding of the motor may include closing a switch between the midpoint of the pair of series connected batteries and a neutral terminal of the stator phase windings.

In addition to one or more of the features described herein, coupling the midpoint of the pair of series connected batteries to the stator winding of the motor comprises closing a switch between the midpoint of the pair of series connected batteries and the respective phase terminal of one of the stator phase windings.

In addition to one or more of the features described herein, controlling the power inverter to operate the power inverter and the stator winding as a switched-mode power converter may include synchronous pulse width modulation control of the power inverter.

In addition to one or more of the features described herein, controlling the power inverter to operate the power inverter and the stator winding as a switched-mode power converter may include interleaved pulse width modulation control of the power inverter.

In addition to one or more of the features described herein, controlling the power inverter to operate the power inverter and the stator winding as a switched-mode power converter may include synchronous pulse width modulation control of the power inverter.

In addition to one or more of the features described herein, controlling the power inverter to operate the power inverter and the stator winding as a switched-mode power converter may include interleaved pulse width modulation control of the power inverter.

In another exemplary embodiment, an apparatus for shuttling charge between a pair of batteries may include the pair of batteries configured in series, a motor including a stator winding having a plurality of stator phase windings commonly coupled at a neutral terminal and having respective phase terminals, a power inverter having a plurality of phase legs coupled between positive and negative DC rails, the positive and negative DC rails coupled across the pair of batteries configured in series, and each phase leg including respective upper and lower solid-state switches with a respective phase pole therebetween coupled to a respective one of the stator phase windings at its corresponding phase terminal, a switch between a midpoint node of the pair of batteries configured in series and the stator winding, and a controller operating the switch closed to couple the midpoint node of the pair of batteries configured in series to at least one phase winding of the plurality of stator phase windings, and controlling conduction of the phase legs of the power inverter to operate the power inverter and the stator winding as a switched-mode power converter comprising at least one of the stator phase windings and one of the upper and lower solid-state switches of at least one of the phase legs.

In addition to one or more of the features described herein, the switch between the midpoint node of the pair of batteries configured in series and the stator winding may include a switch between the midpoint node of the pair of batteries configured in series and the respective phase terminal of one of the stator phase windings.

In addition to one or more of the features described herein, the switch between the midpoint node of the pair of batteries configured in series and the stator winding may include a switch between the midpoint node of the pair of batteries configured in series and the neutral terminal of the plurality of stator phase windings.

In addition to one or more of the features described herein, controlling conduction of the phase legs of the power inverter may include controlling conduction of the respective upper solid-state switch of at least one phase leg to operate the power inverter and the stator winding as a switched-mode power converter wherein energy is transferred from the one of the pair of batteries between the midpoint node and the positive DC rail to the other one of the pair of batteries between the midpoint node and the negative DC rail.

In addition to one or more of the features described herein, controlling conduction of the phase legs of the power inverter may include controlling interleaved conduction of the respective upper solid-state switches of at least two phase legs to operate the power inverter and the stator winding as a switched-mode power converter wherein energy is transferred from the one of the pair of batteries between the midpoint node and the positive DC rail to the other one of the pair of batteries between the midpoint node and the negative DC rail.

In addition to one or more of the features described herein, controlling conduction of the phase legs of the power inverter may include controlling synchronous conduction of the respective upper solid-state switches of at least two phase legs to operate the power inverter and the stator winding as a switched-mode power converter wherein energy is transferred from the one of the pair of batteries between the midpoint node and the positive DC rail to the other one of the pair of batteries between the midpoint node and the negative DC rail.

In addition to one or more of the features described herein, controlling conduction of the phase legs of the power inverter may include controlling conduction of the respective lower solid-state switch of at least one phase leg to operate the power inverter and the stator winding as a switched-mode power converter wherein energy is transferred from the one of the pair of batteries between the midpoint node and the negative DC rail to the other one of the pair of batteries between the midpoint node and the positive DC rail.

In addition to one or more of the features described herein, controlling conduction of the phase legs of the power inverter may include controlling interleaved conduction of the respective lower solid-state switches of at least two phase legs to operate the power inverter and the stator winding as a switched-mode power converter wherein energy is transferred from the one of the pair of batteries between the midpoint node and the negative DC rail to the other one of the pair of batteries between the midpoint node and the positive DC rail.

In addition to one or more of the features described herein, controlling conduction of the phase legs of the power inverter may include controlling synchronous conduction of the respective lower solid-state switches of at least two phase legs to operate the power inverter and the stator winding as a switched-mode power converter wherein energy is transferred from the one of the pair of batteries between the midpoint node and the negative DC rail to the other one of the pair of batteries between the midpoint node and the positive DC rail.

In yet another exemplary embodiment, an electrified vehicle may include an electric propulsion system including a rechargeable energy storage system, a poly-phase electric motor having a stator winding having a plurality of stator phase windings, and a traction power inverter module including a motor controller and a power inverter, the rechargeable energy storage system including a pair of similar or dissimilar batteries configured in series, the power inverter having a plurality of phase legs coupled between positive and negative DC rails, the positive and negative DC rails coupled across the pair of batteries configured in series, and each phase leg including respective upper and lower solid-state switches with a respective phase pole therebetween coupled to a respective one of the stator phase windings at its corresponding phase terminal, a switch between a midpoint node of the batteries configured in series and the stator winding, and the motor controller operating the switch closed to couple the midpoint node of the pair of batteries configured in series to at least one of the stator phase windings, and controlling conduction of the phase legs of the power inverter to operate the power inverter and the stator winding as a switched-mode power converter comprising at least one of the stator phase windings and one of the upper and lower solid-state switches of at least one of the phase legs.

In addition to one or more of the features described herein the motor controller controlling conduction of the phase legs of the power inverter to operate the power inverter and the stator winding as a switched-mode power converter may include an interleaved pulse width modulation control.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIGS. 6A and 6B illustrate an embodiment of a charge shuttling apparatus, in accordance with the present disclosure;

FIGS. 7A and 7B illustrate an embodiment of a charge shuttling apparatus, in accordance with the present disclosure.

DETAILED DESCRIPTION

Figure 1:
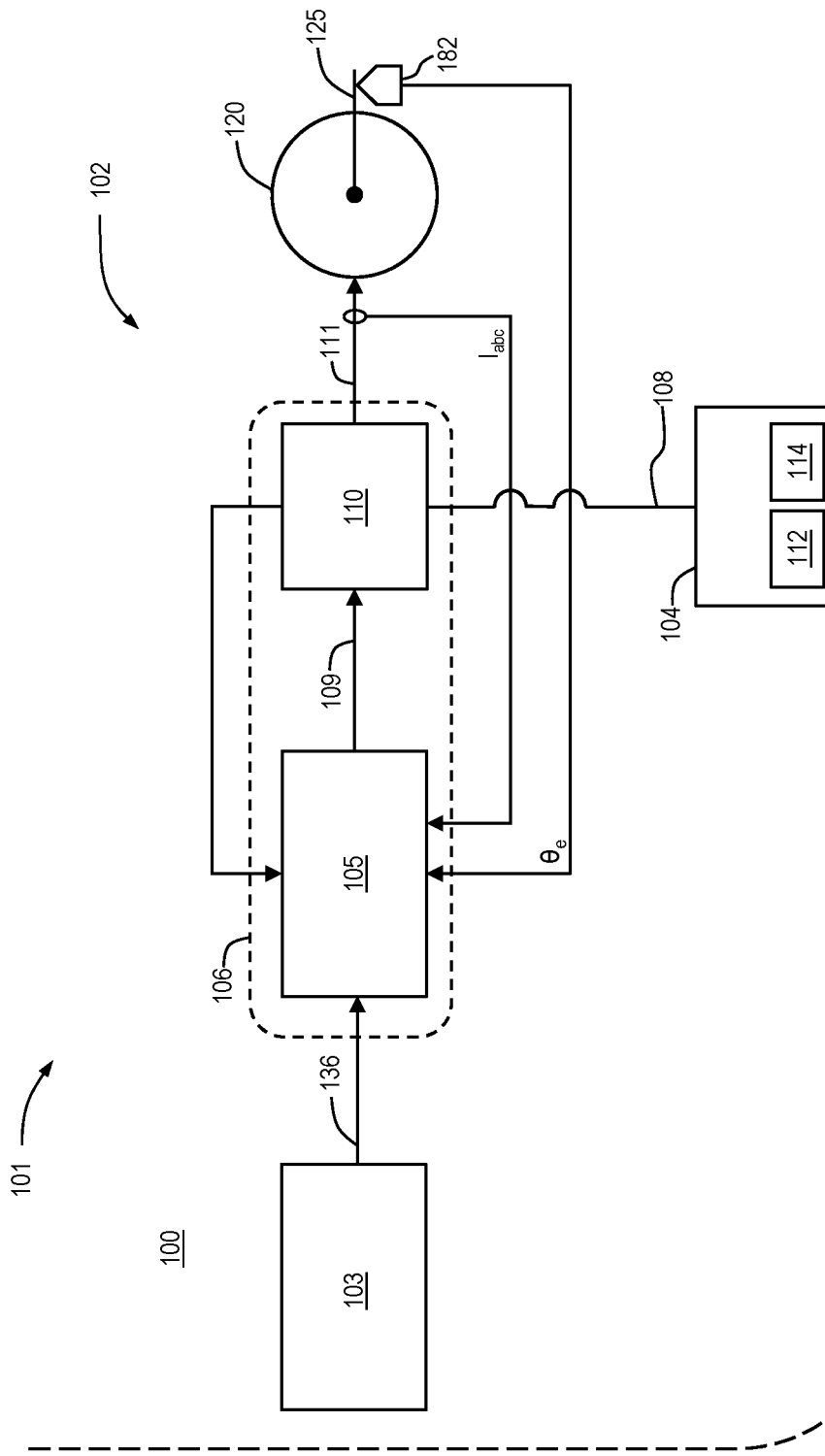
FIG. 1 illustrates an electric propulsion system on a vehicle, in accordance with one or more embodiments.

The following description is merely exemplary in nature and is not intended to limit the present disclosure, its application or uses. Throughout the drawings, corresponding reference numerals indicate like or corresponding parts and features.

FIG. 1 schematically illustrates an embodiment of an electric propulsion system 101 on a vehicle 100. Vehicle and vehicular are understood to refer to any means of transportation including non-limiting examples of motorcycles, cars, trucks, buses, excavation, earth moving, construction and farming equipment, railed vehicles like trains and trams, and watercraft like ships and boats. The electric propulsion system 101 may include various control components, electrical systems and electro-mechanical systems including, for example, a rechargeable energy storage system (RESS) 104 and an electric drive unit (EDU) 102. The electric propulsion system 101 may be employed on a powertrain system to generate propulsion torque as a replacement for, or in conjunction with, an internal combustion engine in various electric vehicle (EV) applications and hybrid electric vehicle (HEV) applications, respectively.

The EDU 102 may be of varying complexity, componentry and integration. An exemplary highly integrated EDU 102 may include, for example, an alternating current (AC) motor (motor) 120 and a traction power inverter module (TPIM) 106 including a motor controller 105 and a power inverter 110. The motor 120 may include a stator and a rotor coupled to a motor output shaft 125 and position sensor 182, for example a variable reluctance resolver or an encoder. The position sensor 182 may signally connect directly to the motor controller 105 and is employed to monitor angular position of the rotor ($\theta_c$) of the motor 120. The angular position of the rotor ($\theta_c$) of the motor 120 is employed by the motor controller 105 to control operation of the inverter module 110 that controls the motor 120.

The motor output shaft 125 may transfer torque between the motor 120 and driveline components (not illustrated), for example a final drive which may include reduction and differential gear sets and one or more axle outputs. The final drive may simply include reduction gearing and a prop shaft output coupling to a differential gear set. One or more axles may couple to the final drive or differential gear sets if separate therefrom. Axle(s) may couple to a vehicle wheel(s) for transferring tractive force between a wheel and pavement. One having ordinary skill in the art will recognize alternative arrangements for driveline components. Propulsion torque requests or commands 136 ($T_{cmd}$) may be provided by a vehicle controller 103 to the motor controller 105.

The motor controller 105 may include one or more control modules. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, and in-plant and service-related networks including for over the air (OTA) software updates. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

The RESS 104 may, in one embodiment, include one or more electro-chemical battery packs 112, for example high capacity, high voltage (HV) rechargeable lithium ion battery packs for providing power to the vehicle via a HV direct current (DC) bus 108. The RESS 104 may also include a battery manager module 114. The RESS 104 may include one or more battery packs allowing for flexibility in configurations and adaptation to application requirements. Battery packs may be constructed from a plurality of battery pack modules allowing for flexibility in configurations and adaptation to application requirements. Battery pack modules may be constructed from a plurality of cells allowing for flexibility in configurations and adaptation to application requirements. For example, in vehicular uses, the RESS 104 may be modular to the extent that the number and arrangement of battery packs, battery pack modules and cells may be varied to accommodate energy density or range objectives of a particular vehicle platform, market requirement, intended use, cost target, packaging constraint, etc. Battery packs, battery pack modules and cells may be variously and selectively configured in accordance with desired propulsion architecture and charging functions. It is understood that the RESS 104 may be reconfigurable at any level of integration including battery pack, battery pack module and cell.

The motor 120 may be a poly-phase AC motor receiving poly-phase AC power over a poly-phase motor control power bus (AC bus) 111 which is coupled to the power inverter 110. In one embodiment, the motor 120 is a three-phase motor and the power inverter 110 is a three-phase inverter. The power inverter 110 may include a plurality of solid-state switches. The power inverter 110 couples to DC power over the HV DC bus 108 (DC input voltage ($V_{dc}$)) from the RESS 104, for example at 400 volts. The motor controller 105 is coupled to the power inverter 110 for control thereof. The power inverter 110 electrically connects to stator phase windings of a three-phase stator winding of the motor 120 via the AC bus 111, with electric current monitored on two or three of the phase leads thereof. The power inverter 110 may be configured with suitable control circuits including paired power transistors (e.g., IGBTs) for transforming high-voltage DC voltage on the HV DC bus 108 to high-voltage three-phase AC voltage ($V_{abc}$) on the AC bus 111 and transforming high-voltage three-phase AC voltage ($V_{abc}$) on the AC bus 111 to high-voltage DC voltage on the HV DC bus 108. The power inverter 110 may employ any suitable pulse width modulation (PWM) control, for example sinusoidal pulse width modulation (SPWM) or space vector pulse width modulation (SVPWM), to generate switching vector signals ($S_{abc}$) 109 to convert stored DC electric power originating in the battery pack 112 of the RESS 104 to AC electric power to drive the motor 120 to generate torque. Similarly, the inverter 110 may convert mechanical power transferred to the motor 120 to DC electric power to generate electric energy that is storable in the battery pack 112 of the RESS 104, including as part of a regenerative braking control strategy. The power inverter 110 may be configured to receive the switching vector signals ($S_{abc}$) 109 from motor controller 105 and control inverter states to provide the motor drive and regeneration functionality. Switching vector signals ($S_{abc}$) 109 may also be referred to herein as conduction commands.

Control of the power inverter 110 may include high frequency switching of the solid-state switches in accordance with the PWM control. A number of design and application considerations and limitations determine inverter switching frequency and PWM control. Inverter controls for AC motor applications may include fixed switching frequencies, for example switching frequencies around 10-12 kHz and PWM controls that minimize switching losses of the IGBTs or other power switches of the power inverter 110.

Figure 2:
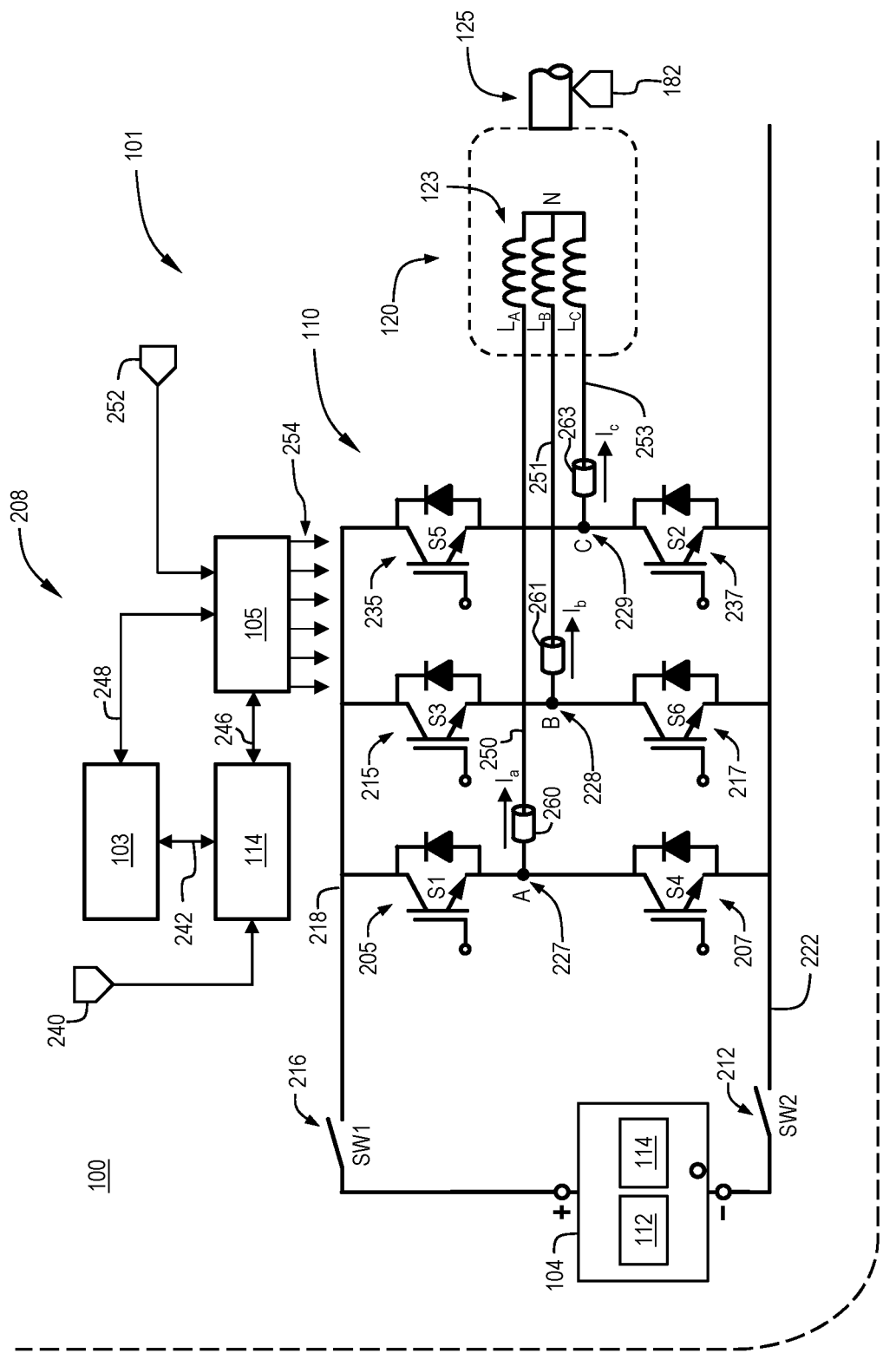
FIG. 2 illustrates an electric propulsion system and control system on a vehicle, in accordance with one or more embodiments.

With additional reference to FIG. 2, the electric propulsion system 101 on the vehicle 100 may include a control system 208 including one or more electronic control units (ECU), for example the vehicle controller 103, the battery manager module 114, and the motor controller 105. The control system 208 may be responsible for carrying out functions related to the electric propulsion system 101 monitoring, control and diagnostics, including RESS charge control or supervision, based upon a plurality of inputs. The vehicle controller 103 may include one or more ECUs and may be responsible for supervising, interpreting various user and environmental inputs, information arbitration, and issuing and receiving control commands and requests to and from various other ECUs, including the battery manager module 114 and the motor controller 105 as illustrated by communication lines 242, 246 and 248. The battery manager module 114 may receive a plurality of inputs 240 related to the RESS 104 including, for example, voltage, current and temperature at cell, module, pack and RESS levels at various module and pack configurations, and may determine state of charge (SOC), depth of discharge (DOD) state of health (SOH) and other metrics at cell, module, pack and RESS levels at various module and pack configurations. The battery manager module 114 may be primarily responsible for charge and discharge control, monitoring and diagnostics of the RESS 104. The motor controller 105 may receive various inputs 252 used in the monitoring, control and diagnosis of the motor 120 and power inverter 110, including phase currents $1a$, $1b$ and $1c$ from respective current sensors 260, 261 and 263 and rotor position information from the position sensor 182. The motor controller 105 may control the motor 120 by issuing conduction commands 254 to inverter solid-state switches S1 205, S2 237, S3 215, S4 207, S5 235 and S6 217. The individual conduction commands are issued for each switch S1-S6 in the form of PWM signals from the motor controller 105. Any suitable solid-state device may be employed as switches S1-S6 including, for example, solid-state relays and transistors such as Si IGBTs, Si MOSFETs, SiC MOSFETs, GaN HEMTs, SiC JFETs, Diamond, Gallium Oxide and other Wide Band Gap (WBG) semiconductor-based power switch devices. Each switch S1-S6 may also have an associated anti-parallel diode either as a discrete component or integrated with each switch S1-S6. In accordance with one embodiment, the battery manager module 114 may be responsible for monitoring and diagnosis of the RESS 104, for discharge and charge control including during propulsion operation and for electric power transfers from and to off-vehicle power sources.

The power inverter 110 includes a positive DC rail 218, a negative DC rail 222 and a plurality of phase legs therebetween. Phase legs in the exemplary 3-phase power inverter 110 include switches S1 and S4 (phase leg A) coupled at node 227 (phase pole A), Switches S3 and S6 (phase leg B) coupled at node 228 (phase pole B), and switches S5 and S2 (phase leg C) coupled at node 229 (phase pole C). Switches S1 205, S3 215 and S5 235 may be referred to as upper solid-state switches as they couple to the positive DC rail 218. Switches S2 237, S4 207 and S6 217 may be referred to as lower solid-state switches as they couple to the negative DC rail 222. Phase pole A (node 227) couples to a phase winding $L_A$ of a stator winding 123 of the motor 120 via line 250. Phase pole B (node 228) couples to a phase winding L B of the stator winding 123 of the motor 120 via line 251. And phase pole C (node 229) couples to a phase winding $L_C$ of the stator winding 123 of the motor 120 via line 253. All phase windings $L_A$, $L_B$ and $L_C$ are coupled at a common neutral point N of the stator winding 123. The terminal ends of the phase windings $L_A$, $L_B$ and $L_C$ opposite the common neutral point N may be referred to as phase terminals. Each line 250, 251 and 253 may have an associated current sensor 260, 261 and 263, respectively, for sensing phase currents. The HV DC bus 108 (FIG. 1) may be selectively coupled across the positive DC rail 218 and the negative DC rail 222 by respective high current disconnect switches. High current disconnect switch SW1 216 is controllable to couple and decouple the positive DC rail 218 and the RESS 104 positive terminal over the HV DC bus 108. Likewise, high current disconnect switch SW2 212 is controllable to couple and decouple the negative DC rail 222 and the RESS 104 negative terminal over the HV DC bus 108. High current disconnect switches SW1 and SW2 may be referred to herein as DC contactors 216, 212 to distinguish them from the power inverter 110 solid-state switches S1-S6 and may be electromechanical relays or solid state switches.

The embodiments herein are described in application at the battery pack level wherein battery packs are understood to include one or more battery pack modules which may include one or more cells. However, such embodiments are described by way of non-limiting example. The subject matter of the disclosure may be practiced at any level of integration including battery pack, battery module and cell. Therefore, the term "battery" may refer to battery pack, battery pack module or cell or combinations or groupings thereof.

Figure 3A:
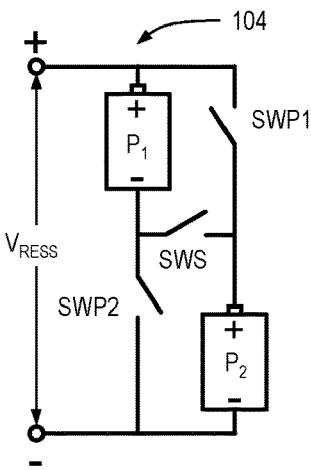
FIGS. 3A, 3B and 3C illustrate various configurations of an exemplary reconfigurable rechargeable energy storage system, in accordance with the present disclosure.
Figure 3B:
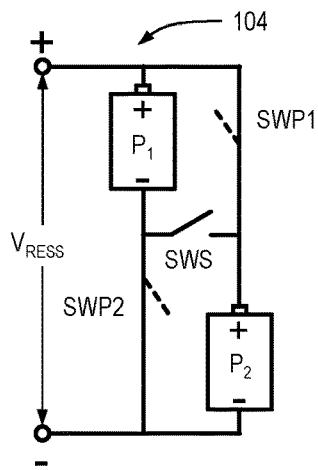
Figure 3C:
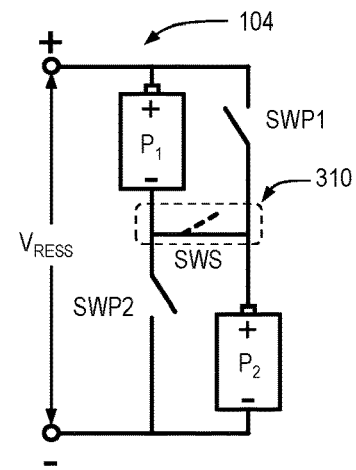

With reference to FIGS. 3A-3C, an exemplary RESS 104 is illustrated in various configurations. RESS 104 may include a pair of battery packs $P_1$ and $P_2$. Battery packs $P_1$ and $P_2$ may have equivalent nominal voltages, for example 400 volts. Both battery packs $P_1$ and $P_2$ may also have equivalent nominal capacities. Controllable switches SWP1, SWP2 and SWS may provide for various configurations of the battery packs $P_1$ and $P_2$ for RESS 104. For example, with SWP1 and SWP2 closed and SWS open, the battery packs $P_1$ and $P_2$ may be configured in parallel (FIG. 3B) for a 400 volt RESS 104 voltage ($V_{RESS}$) during propulsion. With SWP1 and SWP2 open and SWS closed, the battery packs $P_1$ and $P_2$ may be configured in series (FIG. 3C) for an 800 volt RESS 104 voltage ($V_{RESS}$) during direct current fast charging (DCFC). The midpoint node 310 is established between the negative terminal of the battery pack $P_1$ and the positive terminal of the battery pack $P_2$ when switch SWS is closed placing the battery packs $P_1$ and $P_2$ in series. With SWP1, SWP2 and SWS open, the battery packs $P_1$ and $P_2$ may be isolated from each other (FIG. 3A). The RESS 104 may also be selectively coupled to the HV DC bus 108 and to charge ports by way of controllable switches (e.g., SW1 and SW2 described herein and shown in FIG. 2). Some or all such controllable switches and others may be integrated into one or more controllable battery disconnect units (BDU) (not illustrated) or distributed variously within components or subsystems such as the RESS 104. Control of such switches may be from one or more control modules including, for example the vehicle controller 103 and battery manager module 114.

DCFC may be carried out when the RESS 104 is configured with the battery packs $P_1$ and $P_2$ in series (FIG. 3C). However, individual battery pack capacity, SOC, DOD, SOH and voltage may not be equivalent. This may occur even with matched battery packs $P_1$ and $P_2$ of equivalent age, chemistry and design capacity due to factors such as load imbalance, short or long term discharge history differentials, temperature gradients, HV bus wiring, and others. Pack equivalency issues may be expected when the battery packs are known to have a capacity mismatch which may occur when some battery packs, battery modules or cells are replaced in service or if the RESS 104 is configured with battery packs, battery modules or cells of mixed chemistries. Therefore, during DCFC charging of battery packs $P_1$ and $P_2$ in series, one battery pack may achieve charge capacity (SOC=100%) before the other and may be a limiting factor on continuing DCFC. This may result in charge termination to prevent overcharging of the battery pack at 100% SOC.

Thus, one pack may be charged to 100% SOC and 400 volts, and the other pack may be charged at SOC less than 100% and voltage less than 400 volts. Total RESS 104 capacity thus may be compromised and an undesirable voltage differential between the battery packs $P_1$ and $P_2$ may exist. When the battery packs $P_1$ and $P_2$ are reconfigured in parallel a voltage differential between the battery packs may result in substantial inrush current from the battery pack with a higher voltage to the battery pack with the lower voltage and arcing of the switches SWP1 and SWP2.

Figure 4A:
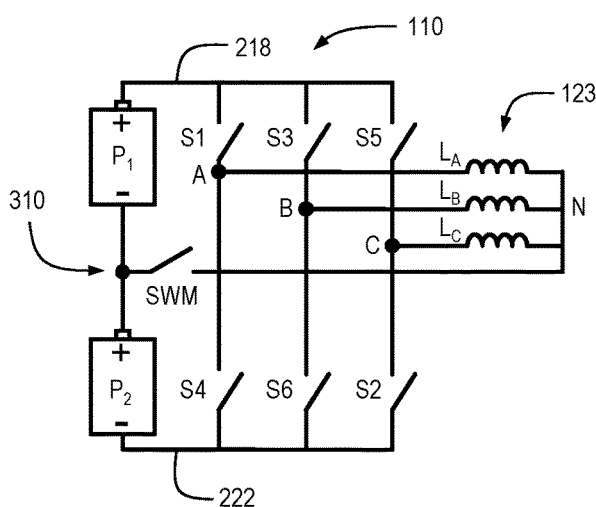
FIGS. 4A and 4B illustrate an embodiment of a charge shuttling apparatus, in accordance with the present disclosure.

To address these issues, battery pack balancing is implemented through a charge shuttling scheme to bring equivalence to the voltages of the battery packs $P_1$ and $P_2$ prior to a parallel reconfiguration. Furthermore, the pack balancing is accomplished while the battery packs $P_1$ and $P_2$ remain configured in series. Additionally, the pack balancing may be invoked ongoingly throughout DCFC or after DCFC is terminated. With further reference to FIGS. 4A, 4B, 5A, 5B, 6A, 6B, 7A and 7B, the power inverter 110 and stator winding 123 provide the power components of a switched-mode power converter for shuttling charge between the battery packs $P_1$ and $P_2$. A switch SWM is coupled between the midpoint node 310 and the stator winding 123. FIG. 4A illustrates an embodiment wherein the switch SWM is between the midpoint node 310 and the neutral point N of the stator winding 123. FIGS. 5A, 6A and 7A illustrate embodiments wherein the switch SWM is between the midpoint node 310 and the phase terminal of one of the phase winding $L_A$, $L_B$ or $L_C$ of the stator winding 123. It is appreciated that the power inverter 110 in FIGS. 4A, 5A, 6A and 7A is illustrated in a simplified form for clarity, including the solid state switches S1-S6. FIGS. 4B, 5B, 6B and 7B are simplified equivalent circuit diagrams corresponding to FIGS. 4A, 5A, 6A and 7A, respectively. The motor controller 105 may control the conduction commands 254 to inverter solid-state switches S1-S6 as further described herein. In operation, through controlled operation of switch SWM and various combinations of the inverter solid-state switches S1-S6, the phase windings $L_A$, $L_B$ and $L_C$ of the stator winding 123 are used, in various configurations, to store energy from one of the battery packs $P_1$ and $P_2$ and release the stored energy into the other of the battery packs $P_1$ and $P_2$ to thereby shuttle charge and balance the battery packs $P_1$ and $P_2$.

Figure 4B:
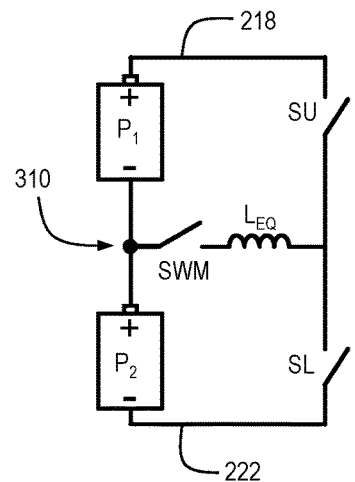
Figure 5A:
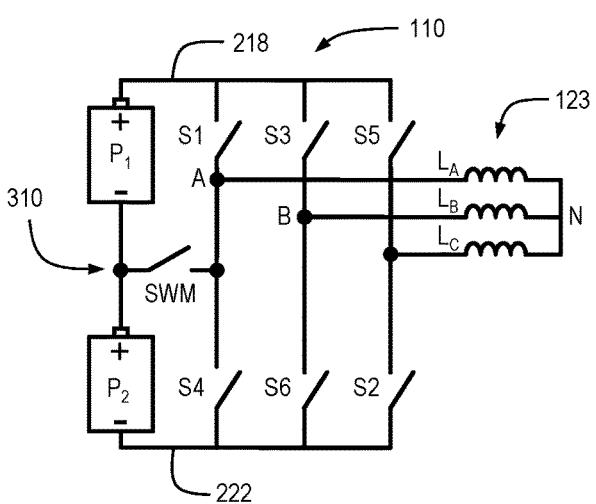
FIGS. 5A and 5B illustrate an embodiment of a charge shuttling apparatus, in accordance with the present disclosure.

With particular reference to the embodiment illustrated in FIGS. 4A and 4B and corresponding Table 1 herein, it is appreciated that various equivalent inductances ($L_{EQ}$) may be established through combinations of a closed SWM switch and closed inverter solid-state switches S1-S6. The inverter solid-state switches S1, S3 and S5 are designated upper switches as they couple between the positive DC rail 218 and respective phase poles A, B and C and phase windings $L_A$, $L_B$ and $L_C$ of the stator winding 123. The inverter solid-state switches S4, S6 and S2 are designated lower switches as they couple between the negative DC rail 222 and respective phase poles A, B and C and phase windings $L_A$, $L_B$ and $L_C$ of the stator winding 123. With the SWM switch closed to couple the midpoint node 310 to the common neutral point N of the stator winding 123 as illustrated in FIG. 4A, the upper and lower switches of the inverter 110 may be controlled in predetermined combinations to achieve various equivalent inductances $L_{EQ}$ and the charge shuttling objectives. Table 1 herein corresponds to FIGS. 4A and 4B wherein the upper switches S1, S3 and S5 may be designated SU and the lower switches S4, S6 and S2 may be designated SL. Various combinations of the upper switches S1, S3 and S5 may be designated as an SU state and various combinations of the lower switches S4, S6 and S2 may be designated as an SL state. From FIG. 4B and Table 1 wherein 0 indicates an open switch and 1 indicates a closed switch, it is appreciated that the closure of any one or more of the upper switches S1, S3 and S5 will establish a current path through the battery pack $P_1$ and the corresponding equivalent inductance $L_{EQ}$. Similarly, the closure of any one or more of the lower switches S4, S6 and S2 will establish a current path through the battery pack $P_2$ and the corresponding equivalent inductance $L_{EQ}$. When only one of the upper switches S1, S3 or S5 is closed (SU STATE I, II or III), $L_{EQ}$ is primarily related to the inductance of the phase winding $L_A$, $L_B$ or $L_C$ corresponding to the respective phase pole A, B or C coupled to the closed upper switch S1, S3 or S5. Similarly, when only one of the lower switches S4, S6 or S2 is closed (SL STATE I, II or III), $L_{EQ}$ is primarily related to the inductance of the phase winding $L_A$, $L_B$ or $L_C$ corresponding to the respective phase pole A, B or C coupled to the closed upper switch S1, S3 or S5. When two of the upper switches S1, S3 and S5 are closed (SU STATE IV, V or VI), $L_{EQ}$ is primarily related to the parallel combined inductances of the two phase windings of $L_A$, $L_B$ and $L_C$ corresponding to the respective two phase poles of A, B and C coupled to the two closed upper switches of S1, S3 and S5. Similarly, when two of the lower switches S4, S6 and S2 are closed (SL STATE IV, V or VI), $L_{EQ}$ is primarily related to the parallel combined inductances of the two phase windings of $L_A$, $L_B$ and $L_C$ corresponding to the respective two phase poles of A, B and C coupled to the two closed lower switches of S4, S6 and S2. When all the upper switches S1, S3 and S5 are closed (SU STATE VII), $L_{EQ}$ is primarily related to the parallel combined inductances of all the phase windings $L_A$, $L_B$ and $L_C$. Similarly, when all the lower switches S4, S6 and S2 are closed (SL STATE VII), $L_{EQ}$ is primarily related to the parallel combined inductances of all the phase windings $L_A$, $L_B$ and $L_C$. Only conductive SU and SL STATES are shown in Table 1 though it is understood that a non-conductive open SU STATE corresponds to all upper switches S1, S3 and S5 being open and a non-conductive open SL STATE corresponds to all lower switches S4, S6 and S2 being open.

TABLE 1

| SU/SL | | | | |
|---|---|---|---|---|
| $PL_A$ S1/S4 | $PL_B$ S3/S6 | $PL_C$ S5/S2 | $L_{EQ}$ | SU/SL STATE |
| 0 | 0 | 1 | $L_C$ | I |
| 0 | 1 | 0 | $L_B$ | II |
| 1 | 0 | 0 | $L_A$ | III |
| 1 | 0 | 1 | $L_A \| L_C$ | IV |
| 1 | 1 | 0 | $L_A \| L_B$ | V |
| 0 | 1 | 1 | $L_B \| L_C$ | VI |
| 1 | 1 | 1 | $L_A \| L_B \| L_C$ | VII |

Figure 5B:
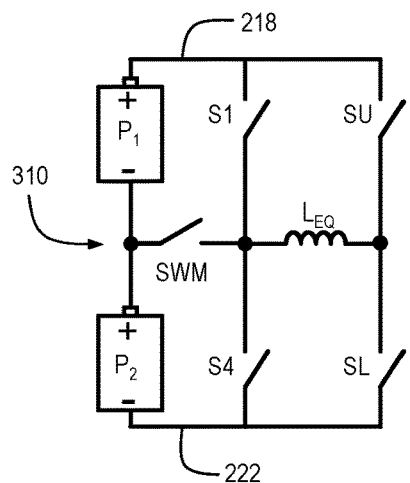

With particular reference to the embodiment illustrated in FIGS. 5A and 5B and corresponding Table 2 herein, it is appreciated that various equivalent inductances ($L_{EQ}$) may be established through combinations of a closed SWM switch and closed inverter solid-state switches S1-S6. The inverter solid-state switches S1, S3 and S5 are designated upper switches as they couple between the positive DC rail 218 and respective phase poles A, B and C and phase windings $L_A$, $L_B$ and $L_C$ of the lower switches as they couple between the negative DC rail 222 and respective phase poles A, B and C and phase windings $L_A$, $L_B$ and $L_C$ of the stator winding 123. With the switch SWM closed to couple the midpoint node 310 to the phase pole A and the phase terminal of the phase winding $L_A$ of the stator winding 123 as illustrated in FIG. 5A, the upper and lower switches of the inverter 110 may be controlled in predetermined combinations to achieve various equivalent inductances $L_{EQ}$ and the charge shuttling objectives. Table 2 herein corresponds to FIG. 5B wherein the upper switches S1, S3 and S5 may be designated SU and the lower switches S4, S6 and S2 may be designated SL. Various combinations of the upper switches S1, S3 and S5 may be designated as an SU state and various combinations of the lower switches S4, S6 and S2 may be designated as an SL state. From FIG. 5B and Table 2 wherein 0 indicates an open switch and 1 indicates a closed switch, it is appreciated that the upper and lower switches S1 and S4 of phase leg A (PLA) remain open and the closure of either or both of the upper switches S3 and S5 will establish a current path through the battery pack $P_1$ and the corresponding equivalent inductance $L_{EQ}$. Similarly, the closure of either or both of the lower switches S6 and S2 will establish a current path through the battery pack $P_2$ and the corresponding equivalent inductance $L_{EQ}$. When only one of the upper switches S3 or S5 is closed (SU STATE I or II), $L_{EQ}$ is primarily related to the series combined inductances of the phase winding $L_A$ and the one of the phase windings $L_C$ or $L_B$ corresponding to the respective phase pole B or C coupled to the closed upper switch S3 or S5. Similarly, when only one of the lower switches S6 or S2 is closed (SL STATE I or II), $L_{EQ}$ is primarily related to the series combined inductances of the phase winding $L_A$ and the one of the phase windings $L_C$ or $L_B$ corresponding to the respective phase pole B or C coupled to the closed lower switch S6 or S2. When both of the upper switches S3 and S5 are closed (SU STATE III), $L_{EQ}$ is primarily related to the series combined inductances of the phase winding $L_A$ and the parallel combined inductances of the two phase windings $L_B$ and $L_C$. Similarly, when both of the lower switches S6 and S2 are closed (SL STATE III), $L_{EQ}$ is primarily related to the series combined inductances of the phase winding $L_A$ and the parallel combined inductances of the two phase windings $L_B$ and $L_C$. Only conductive SU and SL STATES are shown in Table 2 though it is understood that a non-conductive open SU STATE corresponds to all upper switches S1, S3 and S5 being open and a non-conductive open SL STATE corresponds to all lower switches S4, S6 and S2 being open.

TABLE 2

| | SU/SL | | | |
|---|---|---|---|---|
| $PL_A$ S1/S4 | $PL_B$ S3/S6 | $PL_C$ S5/S2 | $L_{EQ}$ | SU/SL STATE |
| 0 | 0 | 1 | $L_A + L_C$ | I |
| 0 | 1 | 0 | $L_A + L_B$ | II |
| 0 | 1 | 1 | $L_A + L_B \| L_C$ | III |

With particular reference to the embodiment illustrated in FIGS. 6A and 6B and corresponding Table 3 herein, it is appreciated that various equivalent inductances ($L_{EQ}$) may be established through combinations of a closed SWM switch and closed inverter solid-state switches S1-S6. The inverter solid-state switches S1, S3 and S5 are designated upper switches as they couple between the positive DC rail 218 and respective phase poles A, B and C and phase windings $L_A$, $L_B$ and $L_C$ of the stator winding 123. The inverter solid-state switches S4, S6 and S2 are designated lower switches as they couple between the negative DC rail 222 and respective phase poles A, B and C and phase windings $L_A$, $L_B$ and $L_C$ of the stator winding 123. With the switch SWM closed to couple the midpoint node 310 to the phase pole B and the phase terminal of the phase winding $L_B$ of the stator winding 123 as illustrated in FIG. 6A, the upper and lower switches of the inverter 110 may be controlled in predetermined combinations to achieve various equivalent inductances $L_{EQ}$ and the charge shuttling objectives. Table 3 herein corresponds to FIG. 6B wherein the upper switches S1, S3 and S5 may be designated SU and the lower switches S4, S6 and S2 may be designated SL. Various combinations of the upper switches S1, S3 and S5 may be designated as an SU state and various combinations of the lower switches S4, S6 and S2 may be designated as an SL state. From FIG. 6B and Table 3 wherein 0 indicates an open switch and 1 indicates a closed switch, it is appreciated that the upper and lower switches S3 and S6 of phase leg B ($PL_B$) remain open and the closure of either or both of the upper switches S1 and S5 will establish a current path through the battery pack $P_1$ and the corresponding equivalent inductance $L_{EQ}$. Similarly, the closure of either or both of the lower switches S4 and S2 will establish a current path through the battery pack $P_2$ and the corresponding equivalent inductance $L_{EQ}$. When only one of the upper switches S1 or S5 is closed (SU STATE I or II), $L_{EQ}$ is primarily related to the series combined inductances of the phase winding $L_B$ and the one of the phase windings $L_A$ or $L_C$ corresponding to the respective phase pole A or C coupled to the closed upper switch S1 or S5. Similarly, when only one of the lower switches S4 or S2 is closed (SL STATE I or II), $L_{EQ}$ is primarily related to the series combined inductances of the phase winding $L_B$ and the one of the phase windings $L_A$ or $L_C$ corresponding to the respective phase pole A or C coupled to the closed lower switch S4 or S2. When both of the upper switches S1 and S5 are closed (SU STATE III), $L_{EQ}$ is primarily related to the series combined inductances of the phase winding $L_B$ and the parallel combined inductances of the two phase windings $L_A$ and $L_C$. Similarly, when both of the lower switches S4 and S2 are closed (SL STATE $L_{EQ}$ is primarily related to the series combined inductances of the phase winding $L_B$ and the parallel combined inductances of the two phase windings $L_A$ and $L_C$. Only conductive SU and SL STATES are shown in Table 1 though it is understood that a non-conductive open SU STATE corresponds to all upper switches S1, S3 and S5 being open and a non-conductive open SL STATE corresponds to all lower switches S4, S6 and S2 being open.

TABLE 3

| | SU/SL | | | |
|---|---|---|---|---|
| $PL_A$ S1/S4 | $PL_B$ S3/S6 | $PL_C$ S5/S2 | $L_{EQ}$ | SU/SL STATE |
| 0 | 0 | 1 | $L_B + L_C$ | I |
| 1 | 0 | 0 | $L_B + L_A$ | II |
| 1 | 0 | 1 | $L_B + L_A \| L_C$ | III |

With particular reference to the embodiment illustrated in FIGS. 7A and 7B and corresponding Table 4 herein, it is appreciated that various equivalent inductances ($L_{EQ}$) may be established through combinations of a closed SWM switch and closed inverter solid-state switches S1-S6. The inverter solid-state switches S1, S3 and S5 are designated upper switches as they couple between the positive DC rail 218 and respective phase poles A, B and C and phase windings $L_A$, $L_B$ and $L_C$ of the lower switches as they couple between the negative DC rail 222 and respective phase poles A, B and C and phase windings $L_A$, $L_B$ and $L_C$ of the stator winding 123. With the switch SWM closed to couple the midpoint node 310 to the phase pole C and the phase terminal of the phase winding $L_C$ of the stator winding 123 as illustrated in FIG. 7A, the upper and lower switches of the inverter 110 may be controlled in predetermined combinations to achieve various equivalent inductances $L_{EQ}$ and the charge shuttling objectives. Table 4 herein corresponds to FIG. 7B wherein the upper switches S1, S3 and S5 may be designated SU and the lower switches S4, S6 and S2 may be designated SL. Various combinations of the upper switches S1, S3 and S5 may be designated as an SU state and various combinations of the lower switches S4, S6 and S2 may be designated as an SL state. From FIG. 7B and Table 4 wherein 0 indicates an open switch and 1 indicates a closed switch, it is appreciated that the upper and lower switches S5 and S2 of phase leg C (PLC) remain open and the closure of either or both of the upper switches S1 and S3 will establish a current path through the battery pack $P_1$ and the corresponding equivalent inductance $L_{EQ}$. Similarly, the closure of either or both of the lower switches S4 and S6 will establish a current path through the battery pack $P_2$ and the corresponding equivalent inductance $L_{EQ}$. When only one of the upper switches S1 or S3 is closed (SU STATE I or II), $L_{EQ}$ is primarily related to the series combined inductances of the phase winding $L_C$ and the one of the phase windings $L_A$ or $L_B$ corresponding to the respective phase pole A or B coupled to the closed upper switch S1 or S3. Similarly, when only one of the lower switches S4 or S6 is closed (SL STATE I or II), $L_{EQ}$ is primarily related to the series combined inductances of the phase winding $L_C$ and the one of the phase windings $L_A$ or $L_B$ corresponding to the respective phase pole A or B coupled to the closed lower switch S4 or S6. When both of the upper switches S1 and S3 are closed (SU STATE III), $L_{EQ}$ is primarily related to the series combined inductances of the phase winding $L_C$ and the parallel combined inductances of the two phase windings $L_A$ and $L_B$. Similarly, when both of the lower switches S4 and S6 are closed (SL STATE III), $L_{EQ}$ is primarily related to the series combined inductances of the phase winding $L_C$ and the parallel combined inductances of the two phase windings $L_A$ and L B. Only conductive SU and SL STATES are shown in Table 1 though it is understood that a non-conductive open SU STATE corresponds to all upper switches S1, S3 and S5 being open and a non-conductive open SL STATE corresponds to all lower switches S4, S6 and S2 being open.

TABLE 4

| SU/SL | | | | |
|---|---|---|---|---|
| $PL_A$ S1/S4 | $PL_B$ S3/S6 | $PL_C$ S5/S2 | $L_{EQ}$ | SU/SL STATE |
| 0 | 1 | 0 | $L_C + L_B$ | I |
| 1 | 0 | 0 | $L_C + L_A$ | II |
| 1 | 1 | 0 | $L_C + L_A \| L_B$ | III |

In operation, each of the embodiments may be effective to shuttle charge from one of the battery packs $P_1$ and $P_2$ into the other of the battery packs $P_1$ and $P_2$ to thereby balance the battery packs $P_1$ and $P_2$ in accordance with an objective of balanced SOC or balanced voltage. Shuttling charge from battery pack $P_1$ to battery pack $P_2$ may include closing the switch SWM followed by issuing conduction commands at the inverter solid-state switches S1-S6 to effect a closed SU STATE which closes the circuit between the battery pack $P_1$ and the corresponding equivalent inductance $L_{EQ}$ thereby charging or energizing $L_{EQ}$. The open SU STATE is then established by the conduction commands for some finite dead time to prevent shorting of the positive DC rail 218 and the negative DC rail 222 prior to establishing the complementary SL STATE. The short dead time may be considered a part of the closed SU STATE duration. The current through $L_{EQ}$ may continue during the dead time by virtue of the anti-parallel diod(es) associated with the lower switch(es) of the complementary SL STATE until conduction commands are issued establishing the complementary closed SL STATE which closes the circuit between the battery pack $P_2$ and the corresponding equivalent inductance $L_{EQ}$ thereby discharging $L_{EQ}$ and transferring the energy stored in $L_{EQ}$ to the battery pack $P_2$. The open SL STATE is then established by the conduction commands for some finite dead time to prevent shorting of the positive DC rail 218 and the negative DC rail 222 prior to establishing a subsequent SU STATE to begin another $L_{EQ}$ charging event thus beginning another energy storage and release cycle through the stator winding 123. The short dead time may be considered a part of the closed SL STATE duration. Operation in the above manner employs lower switch(es) as synchronous rectifiers in discharging $L_{EQ}$. However, it is appreciated that discharging $L_{EQ}$ may be effected exclusively through the anti-parallel diodes associated with lower switches. It is understood that shuttling charge from battery pack $P_2$ to battery pack $P_1$ may be similarly implemented by a closed SL STATE closing the circuit between the battery pack $P_2$ and the corresponding equivalent inductance $L_{EQ}$ thereby charging the equivalent inductance $L_{EQ}$ followed by establishing the complementary closed SU STATE which closes the circuit between the battery pack $P_1$ and the corresponding equivalent inductance $L_{EQ}$ thereby transferring the energy stored in $L_{EQ}$ to the battery pack $P_1$.

PWM control may be employed to control the conduction commands in accordance with a predetermined frequency and corresponding switching period ($T_s$). In the example herein for shuttling charge from battery pack $P_1$ to battery pack $P_2$, the duty cycle (D) of the PWM control corresponds to the on time of SU (i.e., a closed SU STATE) and the remainder of T s (i.e., $(1-D)T_s$) corresponds to the off time of SU (i.e., the open SU STATE). By varying the duty cycle D over the period $T_s$ the output voltage to battery pack $P_2$ may be controlled and the switched-mode power converter may be controlled in the continuous conduction mode (CCM) or discontinuous conduction mode (DCM) may be controlled. Table 5 herein is illustrative of the relative sequencing of PWM control as described herein. Dead time may be labeled DT in Table 5.

TABLE 5

| PWM | | | |
|---|---|---|---|
| $T_S$ | | | |
| $DT_S$ | | $(1-D)T_S$ | |
| Closed SU STATE | DT | Closed SL STATE | DT |
| Open SL STATE | | Open SU STATE | |

In one embodiment and with reference to FIGS. 4A and 4B and Table 1, the SU STATE may be STATE VII wherein upper switch conduction is synchronized or simultaneous through synchronized conduction commands. In one embodiment, the SL STATE is STATE VII wherein upper switch conduction is synchronized or simultaneous. Such PWM control of the power inverter may be referred to herein as synchronous pulse width modulation control. Advantageously, available the SU STATES and complementary SL STATES include STATES I, II and III in which each state's $L_{EQ}$ is substantially equivalent to the others (i.e., $L_A=L_B=L_C$) and whose STATES are completely independent and share no common upper or lower switch closures. Thus, any two or all three of STATES I, II and III may be alternated or interleaved through phase shifted PWM conduction commands. Such interleaved operation may reduce ripple currents through the stator winding 123 and through the battery packs $P_1$ and $P_2$. Such PWM control of the power inverter may be referred to herein as interleaved pulse width modulation control.

In one embodiment and with reference to FIGS. 5A and 5B and Table 2, the SU STATE may be STATE III wherein upper switch conduction is synchronized or simultaneous through synchronized conduction commands. In one embodiment, the SL STATE is state VII wherein upper switches S3 and S5 conduction is synchronized or simultaneous. Such PWM control of the power inverter may be referred to herein as synchronous pulse width modulation control. Advantageously, available SU STATES and complementary SL STATES include states I and II in which each state's $L_{EQ}$ is substantially equivalent to the others (i.e., $L_A+L_B=L_A+L_C$) and whose STATES are completely independent and share no common upper or lower switch closures. Thus, each of STATES I and II may be alternated or interleaved through phase shifted PWM conduction commands. Such interleaved operation may reduce ripple currents through the stator winding 123 and through the battery packs $P_1$ and $P_2$. The embodiments of FIGS. 6A, 6B and Table 3 and FIGS. 7A, 7B and Table 4 are analogous to the embodiment of FIGS. 4A, 4B and Table 1 wherein the respective SU STATE may be STATE III wherein upper switch conduction is synchronized or simultaneous through synchronized conduction commands, the respective SL STATE may be STATE III wherein lower switch conduction is synchronized or simultaneous through synchronized conduction commands, and the STATES I and II may be interleaved through phase shifted PWM conduction commands.

Figure 8:
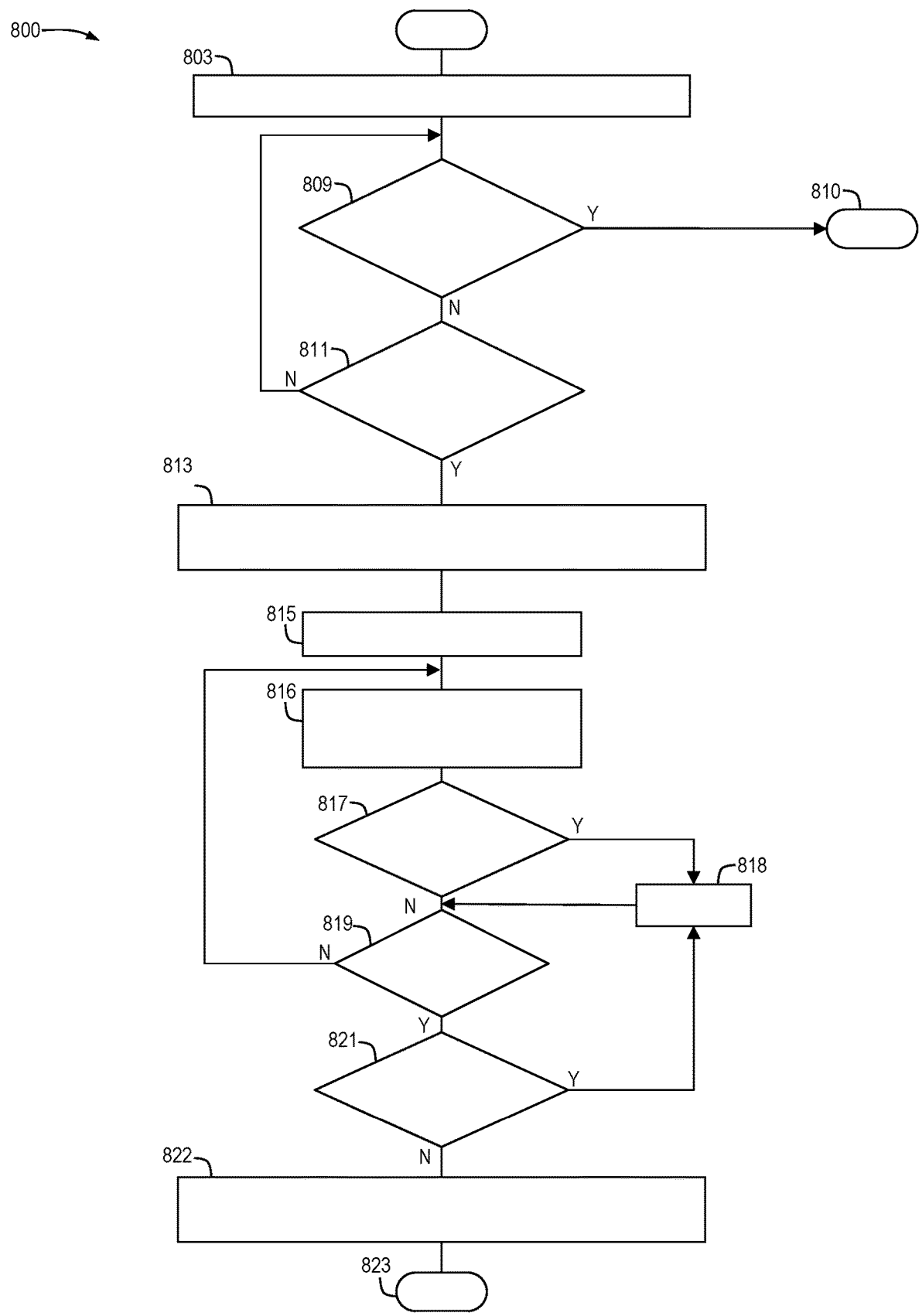
FIG. 8 illustrates a flowchart routine of a plurality of tasks related to recharge of, and charge shuttling within, a rechargeable energy storage system, in accordance with one or more embodiments.

An exemplary method of balancing a pair of battery packs in an electrified vehicle 100 through control of a system as described herein is set forth in FIG. 8. FIG. 8 represents a plurality of tasks in a flowchart routine 800 that may be carried out, at least in part, through the control system 208 including one or more ECUs such as the vehicle controller 103, the motor controller 105, and the battery manager module 114 described in conjunction with FIG. 1 and FIG. 2. At least some of the tasks of FIG. 8 may be embodied in computer readable code or instruction sets stored within non-volatile memory of one or more ECUs. In the present example, the vehicle 100 may have a RESS 104 including a pair of 400 volt battery packs $P_1$ and $P_2$ which may be configured in series at 800 volts for propulsion and DCFC or in parallel at 400 volts for propulsion and in series at 800 volts for DCFC. Beginning at 803, the vehicle operator may bring the vehicle 100 into a charging bay adjacent to an 800 volt capable DCFC charge station and control the vehicle 100 to a stop. Diagnostic checks may be performed at 809 to check for abortive faults prior to proceeding further. Abortive faults will cause the routine to exit at 810. Faults checked at 809 may include, for example, isolation faults related to proper isolation of the high voltage systems of the vehicle and any low voltage systems of the vehicle. The routine 800 will continue to 811 in the absence of abortive faults. At 811, the routine 800 may validate a proper charge port connection including validation of handshaking and communications between the vehicle 100 and the charge station via the charge port connection. Until the charge port connection is validated at 811, the routine continues diagnostic checks at 809 as described. When the charge port connection is validated at 811, the routine 800 continues to 813 where the control system 208 configures the battery packs $P_1$ and $P_2$ in series if required. If the RESS 104 is configured with the battery packs $P_1$ and $P_2$ in series for propulsion, then this task may not be required. Next, at 815, link or bulk capacitors on the vehicle 100 or at the charge station may be checked for appropriate pre-charge voltage levels and pre-charged where needed. At 816, DCFC charging may be performed in accordance with the vehicle charging control including the RESS requirements as established in accordance with monitored RESS 104 metrics including SOC, DOD, SOH and others. The routine 800 continues to 817 whereat, periodically during an ongoing DCFC charging cycle, a determination may be made whether to perform a battery pack balance. For example, mismatched capacities of the battery packs $P_1$ and $P_2$ may result in one of the battery packs $P_1$ and $P_2$ reaching a charge acceptance limiting condition such as reaching DCFC SOC target (e.g., 80%) before the aggregate capacity of the RESS reached the target or reaching a charge voltage limit. In such a situation, it may be advantageous to pause charging during the DCFC charging cycle and perform a balance routine upon the battery packs $P_1$ and $P_2$ at 818. Balancing of the battery packs $P_1$ and $P_2$ at 818 is carried out in accordance with an appropriate hardware and control configuration as described herein in detail. As part of the balancing routine at 818, additional diagnostics related to the power inverter 110 and motor 120 (e.g., shorts, opens, current, voltage and temperature limits, etc.) may be performed and where abortive faults are found may exit the balance routine. After balancing the battery packs $P_1$ and $P_2$ at 818 (or exiting due to abortive faults), the routine 800 returns to 819 whereat a determination is made whether the DCFC is complete. For example, the various RESS metrics including SOC, DOD, SOH and others may indicate a DCFC charge target or limit (e.g., an aggregate RESS SOC) has been reached indicating termination of the DCFC charging cycle. When DCFC charging is not complete, the routine 800 returns to 816 to continue the DCFC charging cycle. When DCFC charging is complete, the routine continues to 821 whereat a determination may be made whether to perform a battery pack balance. For example, subsequent to the end of the DCFC charging cycle as determined at 819, the battery packs $P_1$ and $P_2$ may undergo a final balancing at 818 to achieve individual battery pack voltages whose difference does not present arcing and damage of switch contactors (e.g., SWP1 and SWP2) upon reconfiguration of the battery packs into parallel. When DCFC charging is complete (819) and the battery packs $P_1$ and $P_2$ require no further balancing (821), the routine 800 continues to 822 where the control system 208 may configure the battery packs $P_1$ and $P_2$ in parallel if required. If the RESS 104 is configured with the battery packs $P_1$ and $P_2$ in series for propulsion, then this task may not be required. Subsequent to any reconfiguration at 822, the routine 800 ends at 823.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for electrical energy transfer between a pair of series connected batteries coupled between positive and negative DC rails of a power inverter operatively connected to a plurality of stator phase windings of a stator winding of a motor, comprising:
   coupling a midpoint of the pair of series connected batteries to the stator winding of the motor; and
   controlling the power inverter to operate the power inverter and the stator winding as a switched-mode power converter to charge at least one of the stator phase windings from one of the pair of series connected batteries and to discharge the at least one of the stator phase windings to the other of the pair of series connected batteries,
   wherein coupling the midpoint of the pair of series connected batteries to the stator winding of the motor comprises closing a switch between the midpoint of the pair of series connected batteries and a respective phase terminal of one of the stator phase windings, and
   wherein controlling the power inverter to operate the power inverter and the stator winding as a switched-mode power converter comprises interleaved pulse width modulation control of the power inverter.

2. The method of claim 1 wherein the method is performed periodically during a DC fast charging cycle.

3. The method of claim 1 wherein the method is performed upon completion of a DC fast charging cycle.

4. An apparatus for shuttling charge between a pair of batteries, comprising:
   the pair of batteries configured in series;
   a motor including a stator winding having a plurality of stator phase windings commonly coupled at a neutral terminal and having respective phase terminals;
   a power inverter having a plurality of phase legs coupled between positive and negative DC rails, the positive and negative DC rails coupled across the pair of batteries configured in series, and each phase leg including respective upper and lower solid-state switches with a respective phase pole therebetween coupled to a respective one of the stator phase windings at its corresponding phase terminal;
   a switch between a midpoint node of the pair batteries configured in series and the stator winding, wherein the switch between the midpoint node of the pair of batteries configured in series and the stator winding comprises a switch between the midpoint node of the pair of batteries configured in series and the respective phase terminal of one of the stator phase windings; and
   a controller:
   operating the switch closed to couple the midpoint node of the pair of batteries configured in series to at least one phase winding of the plurality of stator phase windings; and
   controlling conduction of the phase legs of the power inverter to operate the power inverter and the stator winding as a switched-mode power converter comprising at least one of the stator phase windings and one of the upper and lower solid-state switches of at least one of the phase legs,
   wherein controlling conduction of the phase legs of the power inverter to operate the power inverter and the stator winding as a switched-mode power converter comprises interleaved pulse width modulation control of the power inverter.

5. The apparatus of claim 4 wherein controlling conduction of the phase legs of the power inverter comprises controlling conduction of the respective upper solid-state switch of at least one phase leg to operate the power inverter and the stator winding as a switched-mode power converter wherein energy is transferred from the one of the pair of batteries between the midpoint node and the positive DC rail to the other one of the pair of batteries between the midpoint node and the negative DC rail.

6. The apparatus of claim 4 wherein controlling conduction of the phase legs of the power inverter comprises controlling interleaved conduction of the respective upper solid-state switches of at least two phase legs to operate the power inverter and the stator winding as a switched-mode power converter wherein energy is transferred from the one of the pair of batteries between the midpoint node and the positive DC rail to the other one of the pair of batteries between the midpoint node and the negative DC rail.

7. The apparatus of claim 4 wherein controlling conduction of the phase legs of the power inverter comprises controlling synchronous conduction of the respective upper solid-state switches of at least two phase legs to operate the power inverter and the stator winding as a switched-mode power converter wherein energy is transferred from the one of the pair of batteries between the midpoint node and the positive DC rail to the other one of the pair of batteries between the midpoint node and the negative DC rail.

8. The apparatus of claim 4 wherein controlling conduction of the phase legs of the power inverter comprises controlling conduction of the respective lower solid-state switch of at least one phase leg to operate the power inverter and the stator winding as a switched-mode power converter wherein energy is transferred from the one of the pair of batteries between the midpoint node and the negative DC rail to the other one of the pair of batteries between the midpoint node and the positive DC rail.

9. The apparatus of claim 4 wherein controlling conduction of the phase legs of the power inverter comprises controlling interleaved conduction of the respective lower solid-state switches of at least two phase legs to operate the power inverter and the stator winding as a switched-mode power converter wherein energy is transferred from the one of the pair of batteries between the midpoint node and the negative DC rail to the other one of the pair of batteries between the midpoint node and the positive DC rail.

10. The apparatus of claim 4 wherein controlling conduction of the phase legs of the power inverter comprises controlling synchronous conduction of the respective lower solid-state switches of at least two phase legs to operate the power inverter and the stator winding as a switched-mode power converter wherein energy is transferred from the one of the pair of batteries between the midpoint node and the negative DC rail to the other one of the pair of batteries between the midpoint node and the positive DC rail.

11. An electrified vehicle, comprising:
an electric propulsion system including a rechargeable energy storage system, a poly-phase electric motor having a stator winding having a plurality of stator phase windings, and a traction power inverter module including a motor controller and a power inverter;
the rechargeable energy storage system including a pair of batteries configured in series;
the power inverter having a plurality of phase legs coupled between positive and negative DC rails, the positive and negative DC rails coupled across the pair of batteries configured in series, and each phase leg including respective upper and lower solid-state switches with a respective phase pole therebetween coupled to a respective one of the stator phase windings at its corresponding phase terminal;
a switch between a midpoint node of the batteries configured in series and the stator winding, wherein the switch between the midpoint node of the pair of batteries configured in series and the stator winding comprises a switch between the midpoint node of the pair of batteries configured in series and the respective phase terminal of one of the stator phase windings; and
the motor controller:
operating the switch closed to couple the midpoint node of the pair of batteries configured in series to at least one of the stator phase windings; and
controlling conduction of the phase legs of the power inverter to operate the power inverter and the stator winding as a switched-mode power converter comprising at least one of the stator phase windings and one of the upper and lower solid-state switches of at least one of the phase legs,
wherein controlling conduction of the phase legs of the power inverter to operate the power inverter and the stator winding as a switched-mode power converter comprises interleaved pulse width modulation control of the power inverter.

* * * * *